(12) United States Patent
Yuan et al.

(10) Patent No.: US 11,880,114 B2
(45) Date of Patent: Jan. 23, 2024

(54) FERROELECTRIC LIQUID CRYSTALS DAMMANN GRATING FOR LIGHT DETECTION AND RANGING DEVICES

(71) Applicant: The Hong Kong University of Science And Technology, Kowloon (HK)

(72) Inventors: Zhengnan Yuan, Kowloon (HK); Abhishek Kumar Srivastava, Kowloon (HK); Zhibo Sun, Kowloon (HK); Hoi Sing Kwok, New Territories (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 491 days.

(21) Appl. No.: 17/004,530

(22) Filed: Aug. 27, 2020

(65) Prior Publication Data
US 2021/0063841 A1 Mar. 4, 2021

Related U.S. Application Data

(60) Provisional application No. 62/922,777, filed on Aug. 28, 2019.

(51) Int. Cl.
*G02F 1/29* (2006.01)
*G01S 7/481* (2006.01)
(Continued)

(52) U.S. Cl.
CPC .............. *G02F 1/292* (2013.01); *G01S 7/481* (2013.01); *G01S 7/4814* (2013.01);
(Continued)

(58) Field of Classification Search
CPC .......... G02F 1/292; G02F 1/141; G01S 7/481; G01S 17/02; G01S 17/80; G01S 17/06
See application file for complete search history.

(56) References Cited

U.S. PATENT DOCUMENTS 9,551,791 B2  1/2017 Van Den Bossche et al.
9,910,155 B2  3/2018 Lundquist et al.
(Continued)

FOREIGN PATENT DOCUMENTS

CN  105242281 A  1/2016
CN  107533138 A  1/2018
(Continued)

OTHER PUBLICATIONS

Carter, et al., "Lidar 101: An Introduction to Lidar Technology, Data, and Applications (NOAA) Coastal Services Center" Nov. 6, 2012, pp. 1-38.
(Continued)

*Primary Examiner* — Jessica M Merlin
(74) *Attorney, Agent, or Firm* — Amin, Turocy & Watson, LLP

(57) ABSTRACT

Techniques for using ferroelectric liquid crystals Dammann grating (FLCDG) for light detection and ranging devices are disclosed. In LiDAR devices, accuracy, response time, and cost performance can be limited by some factors, such as laser pulse width, time resolution of a time-to-digital conversion chip, detector bandwidth, shot noise, and time error generated by electronic circuits. A FLCDG-based architecture can improve a LiDAR device, and provide for one-shot capturing due to the high switching speed at very low driving voltage provided by ferroelectric liquid crystals and the equal diffracting ability of Dammann grating.

20 Claims, 18 Drawing Sheets

(51) Int. Cl.
G02F 1/141 (2006.01)
G01S 17/89 (2020.01)
G01S 17/02 (2020.01)

(52) U.S. Cl.
CPC .......... *G01S 7/4816* (2013.01); *G01S 7/4817* (2013.01); *G01S 17/02* (2013.01); *G01S 17/89* (2013.01); *G02F 1/141* (2013.01)

(56) References Cited

U.S. PATENT DOCUMENTS

| | | | |
|---|---|---|---|
| 10,473,767 | B2 | 11/2019 | Xiang et al. |
| 2007/0223004 | A1* | 9/2007 | Baillon .................. G01P 5/26 356/485 |
| 2013/0169909 | A1* | 7/2013 | Srivastava ........ G02F 1/133528 349/96 |
| 2014/0118643 | A1 | 5/2014 | Huang |
| 2015/0062558 | A1 | 3/2015 | Koppal et al. |
| 2015/0138496 | A1* | 5/2015 | Srivastava ......... C09K 19/0225 349/183 |
| 2018/0031703 | A1 | 2/2018 | Ngai et al. |
| 2018/0255289 | A1 | 9/2018 | Piestun |
| 2018/0267151 | A1 | 9/2018 | Hall et al. |
| 2018/0292532 | A1 | 10/2018 | Meyers et al. |
| 2018/0364334 | A1 | 12/2018 | Xiang et al. |
| 2019/0041519 | A1 | 2/2019 | Spickermann et al. |
| 2021/0011290 | A1* | 1/2021 | Maimone ............... G09G 3/001 |

FOREIGN PATENT DOCUMENTS

| | | | | | |
|---|---|---|---|---|---|
| CN | 108375774 | A | | 8/2018 | |
| CN | 108572487 | A | * | 9/2018 | |
| CN | 110133615 | A | * | 8/2019 | ............ G01S 17/08 |
| GB | 2263982 | A | * | 8/1993 | ............ C07C 69/92 |

OTHER PUBLICATIONS

Wang, et al., "Underwater three-dimensional range-gated laser imaging based on triangular-range-intensity profile spatial-correlation method," Optoelectronic Imaging and Multimedia Technology IV. vol. 10020. International Society for Optics and Photonics, Oct. 31, 2016, 6 pages.
Wang, et al., "Triangular-range-intensity profile spatial-correlation method for 3D super-resolution range-gated imaging," Applied optics 52.30, Oct. 18, 2013, 8 pages.
Whyte, et al., "Application of lidar techniques to time-of-flight range imaging," Applied Optics, 54(33), 11 pages.
Liu, et al., "Gradient index circuit by waveguided metamaterials," Feb. 18, 2009, 4 pages.
Gollub, et al., "Large Metasurface Aperture for Millimeter Wave Computational Imaging at the Human-Scale," Nov. 1, 2016, 9 pages.
Royo, et al., "An Overview of Imaging Lidar Sensors for Autonomous Vehicles," 37 pages.
McManamon, et al., "A comparison flash lidar detector options," Laser Radar Technology and Applications XXI. vol. 9832. International Society for Optics and Photonics, May 13, 2016, 24 pages.
An, et al., "Compressive Sensing-Based Three-Dimensional Laser Imaging with Dual Illumination," , in IEEE Access, vol. 7, Jan. 12, 2019, 10 pages.
Buck, et al., "Multi-function Coherent Ladar 3D Imaging with S3," Proc. SPIE, 2007, Jul. 20, 2016, 11 pages.
Shalev-Shwartz, et al., "On a Formal Model of Safe and Scalable Self-driving Cars," arXiv:1708.06374v6 [cs.RO] Oct. 27, 2018, 37 pages.
Lin, "The Ethical Dilemma of Self-Driving Cars," https://www.ted.com/talks/patrick_lin_the_ethical_dilemma_of_self_driving_cars#t-25950, Retrived from the Internet: Aug. 14, 2020, 4 pages.
Jo, et al., "High resolution three-dimensional flash LIDAR system using a polarization modulating Pockels cell and a micro-polarizer CCD camera," vol. 24, No. 26,Optics Express A1580, Dec. 26, 2016, 6 pages.

Gu, et al., "Switchable liquid crystal grating with sub millisecond response," , Appl. Phys. Lett., 87 (20), 201106, (2005). Mar. 12, 2005, 5 pages.
Gibbons, et al., "Optically generated liquid crystal gratings," Appl. Phys. Lett., 65 (20), 2542, (Jun. 4, 1994) 4 pages.
Srivastava, et al., "Fast Ferroelectric liquid crystal grating based on orthogonal photo alignments," Appl. Phys. Lett., 100, 031112, Jul. 18, 2012, 6 pages.
Hirabayashi, et al., "Liquid crystal devices for optical communication and information processing systems," Liq. Cryst. 14(2), 307-317, Jan. 1, 1993, 12 pages.
Hirabayashi, et al., "Free-space optical interconnections with liquid-crystal microprism arrays," Appl. Opt. 34(14), , May 1, 1995, 10 pages.
Drolet, et al., "Compact, integrated dynamic holographic memory with refreshed holograms," Opt. Lett. 22(8), Apr. 15, 1997, 3 pages.
Morris, et al., "Fast-switching phase gratings using in-plane addressed short-pitch polymer stabilized chiral nematic liquid crystals," Appl. Phys. Lett. (99), 253502, Dec. 20, 2011, 4 pages.
Garbone, et al., "Short pitch cholesteric electro-optical device based on periodic polymer structures," , Appl. Phys. Lett., 95, 011102, May 14, 2009, 4 pages.
Fan, et al., "Switchable liquid crystal grating with sub millisecond response," Appl. Phys. Lett., vol. 100, 111105 Jul. 18, 2012, 5 pages.
Yan, et al., "High-efficiency and fast-response tunable phase grating using a blue phase liquid crystal," Opt. Lett. 36, 1404, Apr. 15, 2011, 3 pages.
Yeung, et al., "Fast-response no-bias-bend liquid crystal displays using nanostructured surfaces," Applied Physics Letters, Feb. 7, 2006, 4 pages.
Rablau, "LIDAR—A new (self-driving) vehicle for introducing optics to broader engineering and non-engineering audiences. In Education and Training in Optics and Photonics," In Education and Training in Optics and Photonics (p. 11143_138). Optical Society of America., Jul. 2, 2019, 15 pages.
Kadambi, et al., "Coded aperture compressive 3-D LIDAR," , in IEEE International Conference on Acoustics, Speech and Signal Processing (IEEE, 2015, Apr. 19, 2015, 5 pages.
ouster.com, "OS1," https://ouster.com/products/os1-lidar-sensor/, Retrieved from the Internet, Aug. 14, 2020, 11 pages.
Seff, et al., "Learning from Maps: Visual Common Sense for Autonomous Driving," arXiv:1611.08583v2 [cs.CV] Dec. 7, 2016, 7 pages.
McManamon, "LiDAR technologies and systems," Jul. 10, 2019, 4 pages.
McManamon, et al., "Optical phased array technology," Proc. IEEE 84(2), 268-298 (Feb. 1, 1996), 31 pages.
An, et al., "Compressive Sensing-Based Three-Dimensional Laser Imaging with Dual Illumination," in IEEE Access, vol. 7 Feb. 21, 2019, 10 pages.
Hetherington, "Topographic laser ranging and scanning: principles and processing," Jan. 1, 2008, 4 pages.
Hu, et al., "Analysis of polarization modulation laser ranging principle," 2018 IEEE International Conference on Mechatronics and Automation (ICMA), Aug. 1, 2018, 6 pages.
Chen, et al., "Polarization-modulated three-dimensional imaging using a large-aperture electro-optic modulator," Applied optics, 2018, 57(27), Sep. 12, 2018, 9 pages.
Fan, et al., "Ferroelectric Liquid Crystal Dammann Grating by Patterned Photoalignment," Crystals 7.3 (2017): Mar. 6, 2017 8 pages.
Hu, et al., "Analysis of continuous and pulsed laser ranging systems based on electro-optical modulation," LIDAR Imaging Detection and Target Recognition 2017. vol. 10605. International Society for Optics and Photonics, Nov. 15, 2017, 2 pages.
Yu, et al., "Distorted Dammann grating," Optics Letters / vol. 38, No. 4 / Feb. 15, 2013, 3 pages.
Zhang, et al., "Three-dimensional profilometry using a Dammann grating," 7 pages.
Sato, et al., "Liquid Crystal Range Finder—A High-Speed Range-Imaging System Using Liquid Crystal Shutter," vol. 71-D, No. 7, Jul. 1, 1988, pp. 1249-1257.

(56) References Cited

OTHER PUBLICATIONS

Flynn, et al., "Novel polarization-sensitive micropulse lidar measurement technique," 6 pages.
Luey, et al., "A Lightweight, Cost-Efficient, Solid-State LIDAR System Utilizing Liquid Crystal Technology for Laser Beam Steering for Advanced Driver Assistance," Last Accessed: Aug. 14, 2020, 9 pages.
Wang, et al., "Progress and analysis of the liquid crystal phased array technology in ladar," Jul. 28, 2010, 4 pages.
An, et al., "Compressive Sensing-Based Three-Dimensional Laser Imaging With Dual Illumination," Feb. 21, 2019, 10 pages.
Carter, et al., "Lidar 101: An Introduction to Lidar Technology, Data, and Applications (NOAA) Coastal Services Center" Nov. 6, 2012, pp. 39-76.

\* cited by examiner

550

502

800

| | | | | |
|---|---|---|---|---|
| 801 | 802 | 803 | 804 | 805 |
| 806 | 807 | 808 | 809 | 810 |
| 811 | 812 | 813 | 814 | 815 |
| 816 | 817 | 818 | 819 | 820 |
| 821 | 822 | 823 | 824 | 825 |

FIG. 8A

FERROELECTRIC LIQUID CRYSTALS DAMMANN GRATING FOR LIGHT DETECTION AND RANGING DEVICES

CROSS REFERENCE TO RELATED APPLICATION

The subject patent application claims priority to U.S. Provisional Patent Appln. No. 62/922,777, filed Aug. 28, 2019, and entitled "FERROELECTRIC LIQUID CRYSTALS DAMMANN GRATING FOR LIGHT DETECTION AND RANGING DEVICES," the entirety of which application is hereby incorporated by reference herein.

TECHNICAL FIELD

The present application relates to three-dimensional mapping devices, and particularly to Light Ranging and Detection (LiDAR) devices.

BACKGROUND

LiDAR generally comprises a laser ranging technology, that can adopt an active laser light source to achieve three-dimensional-imaging (3D-imaging). Compared with other depth-mapping techniques, a LiDAR system can possess a strong anti-interference ability, a high ranging accuracy, and a small volume and light weight that can be suitable for aerospace uses, automatic vehicles, long-distance nanometer-scale ranging, and nondestructive measurement of micro-vibration targets. Some LiDAR devices can require a fast response with high resolution images.

In some approaches, variable ranging methods are applied, ranging from geometric optical ranging approaches, pulse time-of-flight ranging approaches, phase approaches, frequency-modulated continuous wave ranging approaches, and polarization modulation ranging approaches. Among these approaches, polarization-modulated laser ranging technology can analyze and extract distance information to be measured by optical effects, reducing the distance error introduced by the photoelectric conversion process and the circuit system. As a result, using electro-optic modulation can effectively reduce the impact of noise, improve the accuracy of ranging, and achieve long-distance high-precision ranging. Apart from that, this approach can show a promising ability in using an area array detector to obtain the target distance in laser 3D-imaging.

Bottlenecks can still exist in these approaches, where accuracy, response time and cost performance based on these approaches can be limited by some factors, such as laser pulse width, a time resolution of a time-to-digital conversion chip, detector bandwidth, and shot noise and time error generated by electronic circuits. Furthermore, raster based scanning can be slow for a LiDAR system, particularly for dynamic ranging.

BRIEF DESCRIPTION OF DRAWINGS

Various non-limiting embodiments of the subject disclosure are described with reference to the following figures, wherein like reference numerals refer to like parts throughout unless otherwise specified.

FIG. 8A illustrates a schematic graph of processed intensity maps, in accordance with one or more embodiments described herein.

DETAILED DESCRIPTION

Figure 1:
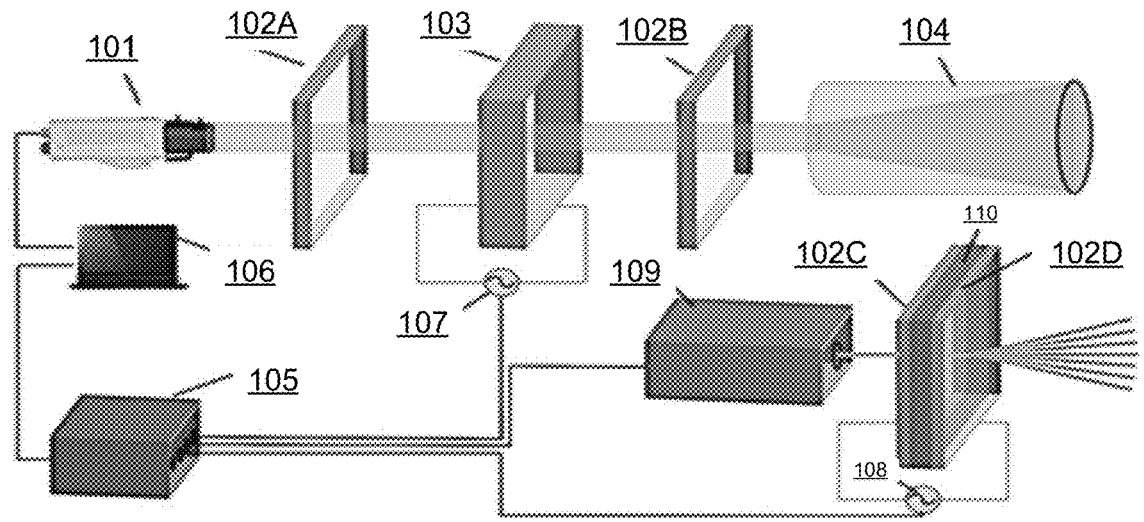
FIG. 1 illustrates an exemplary schematic diagram of ferroelectric Liquid crystals Dammann grating for LiDAR devices, where the receiver includes one detector, in accordance with one or more embodiments described herein.

Various types of LiDAR devices have been implemented. These types of LiDAR devices include frequency modulated continuous wave LiDAR, time of flight (TOF) LiDAR, scanning LiDAR, solid-state scanning LiDAR, mechanical scanning LiDAR, microelectromechanical (MEM) mirror LiDAR, optical phase array (OPA) LiDAR, flash LiDAR, line flash LiDAR, array flash LiDAR, micro-polarizer camera LiDAR, and spectral scanning LiDAR. These various types of LiDAR can have drawbacks. For example, scanning LiDAR devices can have a slow response time, be expensive, lack a flexible scanning pattern, and can utilize moving parts that can be susceptible to malfunction. Then, flash LiDAR devices can have a high cost (with a pulsed laser or liquid crystal on silicon (LCOS)), have a sensitive detector, or lack a uniform light beam.

Types of LiDAR devices that approach solid-state scanning devices are still not completely solid state because they utilize MEM mirrors. While flash LiDAR can achieve line or array points scanning, and have a response speed that is faster than a scanning LiDAR device, this response speed may still be insufficient for some applications. The pulsed laser, LCOS, and sensitive detector used in flash LiDAR can be expensive. Additionally, a non-uniformity of an extended laser beam can lead to a sparse spot problem.

Furthermore, a flash LiDAR device can have difficulty operating in poor weather conditions (including where there is smoke or dust), such as poor weather conditions that can be encountered by autonomous driving systems. Autonomous driving systems can also require a fast response time (e.g., where a large and heavy object falls off a truck in front of the can utilizing an autonomous driving system, or a pedestrian darts out into the street), and a response time this fast may not be provided by a flash LiDAR device.

In autonomous driving systems, a LiDAR device can be designed to have a response frequency of 20 cycles per second (Hz). Where a LiDAR response is half of a response time of a system (which can include things like data transfer, analyzing the data, and making a decision), this can provide for an autonomous driving response within 0.1 seconds.

The act of raster scanning in some LiDAR devices can be time-consuming, since it involves scanning a front view line-by-line or point-by-point. In contrast, utilizing a Dammann grating (a binary grating that can generate a one-dimensional or two-dimensional array of equal-intensity spots) in a LiDAR device can provide for a faster response time. A final pattern from utilizing a Dammann grating can be a Fourier Transform of two identical patterns. Transition points between different phases can be 0-pi. This optic diffraction apparatus can split a source into an array of beams with equal intensity. With a Dammann grating, an array of points can be projected that can capture a scene at once, which can lead to time savings relative to scanning Additionally, these equal intensity beams can be equal in intensity, in contrast to a non-uniformity of an extended laser source.

Other technologies such as liquid crystal metasurface based beam steering, and optical phase arrays, can have issues. For example, liquid crystal metasurface based beam steering can have a high order diffraction interference; have an unequal energy of a spot array; have a size so large that integrating such a device into a system can be challenging; and can have a slow speed. Likewise, an optical phase array can have a short operation distance; a small signal-to-noise ratio; a small angular resolution; have thermodynamic issues with materials; and have a complex fabrication process.

Given these considerations with the art, it can be an improvement to reduce scanning time, improve accuracy, and make LiDAR cost effective.

An embodiment comprises a ferroelectric liquid crystal (FLC) Dammann grating (FLCDG) based LiDAR device. A Dammann grating can generally be a binary phase grating that is used to product an array of equal-intensity light spots. For instance, when one laser beam is shown through a Dammann grating, the light emitting from the other side of the Dammann grating can be an array of multiple light spots, each of which has an equal intensity of light. Ferroelectric liquid crystals can generally be chiral smectic liquid crystals that exhibit ferroelectric properties, where ferroelectric properties can generally relate to having a spontaneous electric polarization that can be reversed when an electrical field is applied to the material from an external source.

A FLCDG based LiDAR device can include a transmitter having a laser and at least one diffracting Dammann grating component, and a receiver. The diffracting Dammann grating component can include two polarizers, and at least one liquid crystal diffractive light modulating cell with a phase profile of a Dammann grating placed between the two polarizers (which can be referred to as a Dammann grating liquid crystal cell).

The Dammann grating liquid crystal cell can include two transparent substrates coated with a current conducting layer, and at least one patterned alignment layer coated on at least one of the substrates, where the patterned alignment layer is patterned to satisfy the Dammann grating phase profile, and a ferroelectric liquid crystal layer sandwiched between the two transparent substrates.

The receiver can include at least one electro-optic modulator, and at least one detector. The electro-optic modulator can include two polarizers, and a liquid crystal diffractive light modulating cell placed between the two polarizers. The liquid crystal diffractive light modulating cell can include two transparent substrates treated by photo-alignment, and a liquid crystal layer disposed between the two transparent substrates with current conducting layers.

Embodiments disclose herein can use FLCDGs as an optic splitting apparatus at a transmitter in a LiDAR device. In LiDAR devices, accuracy, response time, and cost performance can be limited by some factors, such as a laser pulse width, a time resolution of a time-to-digital conversion chip, a detector bandwidth, a shot noise, and a time error generated by electronic circuits. A FLCDG-based architecture can improve a LiDAR device, and provide for one-shot capturing due to having a characteristic of a high switching speed at very low driving voltage provided by ferroelectric liquid crystals and the equal diffracting ability of Dammann grating.

Prior techniques can involve LiDAR via iterative scanning approaches. In contrast, a LiDAR device that utilizes a ferroelectric liquid crystal Dammann grating can perform one-shot capturing. Additionally, such a LiDAR device can provide for a fast data collection period (e.g., <5 microseconds (µs)) with a low cost. Additionally, a device according to the present techniques can have a fast initialization evaluation, such as one within 1 µs.

FLCDG based polarization modulated depth-mapping techniques are disclosed. In some examples, a ferroelectric liquid crystal Dammann grating can be utilized as a high-speed shutter according to these techniques. In such an embodiment, data collection can be sped up by replacing a raster-scanning system with a one-time projection for an entire target. Additionally, a cost of a LiDAR device can be significantly reduced with FLC techniques. In some examples, a charge-coupled device (CCD) camera and an electro-optical modulator are utilized as an imaging sensor and a modulator for time-resolution, respectively. In some examples, a device according to these techniques can combine a fast-data collection period with a low device cost. A relationship between an intensity of polarized light and a corresponding depth of extracted information can be analyzed to verify that the present techniques function well. By utilizing ferroelectric liquid crystal Dammann grating, LiDAR can be implemented as a one-shot capturing system, as opposed to a system that performs iterative scanning LiDAR devices according to the present techniques can be utilized for 3D imaging.

A FLCDG based polarization modulated depth-mapping system can utilize a ferroelectric liquid crystal Dammann grating as a high-speed shutter. Utilizing such techniques, a data collection procedure can be sped up by replacing a raster scanning system with a one-time projection for a whole target. Additionally, such a device can possess a fast data-collection period with a low cost. This can permit a LiDAR device to serve as a one-shot capturing system instead of a system that utilizes iterative scanning.

In some examples, double-cell implementation can shorten a shutter time relative to a single-cell implementation.

In some examples, N Dammann grating patterned FLC cells can be combined to generate $2^N$ switchable patterns for real-time short distance error calibration and higher flexibility of detection patterns.

A device according to the present techniques can substitute traditional raster scanning system with a one-time projection to whole target, and speed up a data-collection process by utilizing a diffractive spot array generated by DG and FLC materials' electro-optic effects, such as fast response. According to these techniques, LiDAR can be utilized for a larger scope of applications that require fast scanning time and high resolution with a significantly lower cost that prior approaches. An example of such an application can be 3D mapping.

In some examples, a response time of a LiDAR device can be modified by applying a deformed helix ferroelectric based electro-optic modulator. Additionally, a hybrating grating with Dammann grating can be utilized to enhance an image quality captured by a one-shot capturing system.

A LiDAR device according to these techniques can have many applications, such as ranging for 3D mapping, target detection (including underwater targets), autonomous driving systems, long-distance nanometer-scale ranging, and nondestructive measurement of a micro-vibration target.

Measurements of a close target can be determined using the present techniques. Diffractive and non-diffractive switching can be utilized. A reference non-diffraction state can be set as a calibration in real time (where a diffraction angle is a known parameter), and a relative distance of a target can be determined accurately and quickly using these parameters. That is, a distance error can be calibrated in real time.

Flexible patterns with cloud points can be used with the present techniques. Consider an example of a combination of a 7×7 Dammann grating and a 15×15 Dammann grating. Tunable patterns and a tunable field of view can be derived in this example. A pattern can be adjusted so that more points project on an effective testing area and fewer points project on other areas, and so a target can be detected with a high efficiency and with a desired data load. In some examples, with a close distance, a high-resolution pattern can be utilized, and for a large distance, a small resolution pattern can be utilized.

Advantages of the present techniques can include an improvement in a flexibility of a detection area; an optimization of detection precision and a uniformly projected light beam; providing for short-distance calibration in real time for polarization modulated ranging techniques, orentational detection; cost effectiveness; a flexible field of view; a compact size; and easy fabrication.

A FLC material can involve relatively simple material processing, have a sufficiently fast response time, and have a sufficiently low driving voltage (e.g., 5 volts per micrometer (V/μm) at 10 μs, and 1 V/μm at 120 μs). A FLC material can provide for an optic diffraction apparatus that can generate equal intensity array with a fast response. A cholesteric liquid crystal display (LCD) standing helix and a blue phase LCD can be fast, but require a relatively high driving, which can lead to high power consumption and be bad for a high-resolution complementary metal-oxide-semiconductor (CMOS) device.

To fabricate an optic splitting apparatus that can generate light beams with equal intensity and provide for fast switching—a FLCDG—a Dammann grating mask can have one basic pattern. A FLCDG can also comprise two transparent substrates with indium tin oxide (ITO). Double explosions can be utilized for alignment. A first explosion can be performed without a mask, and a second explosion can be performed with a Dammann grating mask to selectively rewrite a direction of alignment. The substrates can then be exposed under polarized ultraviolet (UV) light to generate a first alignment direction. In a second exposure, a prepared Dammann grating chrome mask can be placed into contact with a sulphuric azo-dye (SD1) substrate, which can then be exposed again under polarized UV light in a perpendicular polarized direction relative to the first exposure.

A SD1 can be dissolved in dimethylformamide (2% weight) that is spin-coated to a thickness of around 10-15 nanometers (nm). A cell gap of an alignment layer to a Dammann grating phase profile can be 1.5 μm. ESHFLC can be sandwiched between substrates.

An example device according to the present techniques can comprise a diffracting FLCDG component, a laser configured to emit light through the ferroelectric liquid crystal Dammann grating component, and a receiver configured to detect at least some of the light emitted by the laser that is incident upon, and then reflected from a target, e.g., that bounces off the target. In some examples, the FLCDG component can comprise two polarizers, and a liquid crystal diffractive light modulating cell with a phase profile of a Dammann grating positioned between the two polarizers.

In some examples, the liquid crystal diffractive light modulating cell can comprise two transparent substrates coated with a current conducting layer, a patterned alignment layer, coated on one of the transparent substrates, wherein the patterned alignment layer is patterned to satisfy the phase profile of the Dammann grating, and a ferroelectric liquid crystal layer positioned between the two transparent substrates. In some examples, the patterned alignment layer comprises a photoalignment layer that aligns ferroelectric liquid crystals of the ferroelectric liquid crystal layer in patterns according to the Dammann grating profile. In some examples, the ferroelectric liquid crystals of the ferroelectric liquid crystal layer comprise electrically suppressed helix ferroelectric liquid crystals with a helix pitch smaller than a thickness of the ferroelectric liquid crystal layer.

In some examples, ferroelectric liquid crystals of the ferroelectric liquid crystal layer comprise surface stabilized ferroelectric liquid crystals with a helix pitch larger than a thickness of the ferroelectric liquid crystal layer. In some examples, ferroelectric liquid crystals of the ferroelectric liquid crystal layer comprise deformed helix ferroelectric liquid crystals with a helix pitch that is smaller than a thickness of the ferroelectric liquid crystal layer. In some examples, ferroelectric liquid crystals of the ferroelectric liquid crystal layer comprise anti-ferroelectric liquid crystals.

In some examples, ferroelectric liquid crystals of the ferroelectric liquid crystal layer comprise deformed helix ferroelectric liquid crystals with a helix pitch much smaller than a thickness of the ferroelectric liquid crystal layer.

In some examples, the liquid crystals comprise hematic liquid crystals. In some examples, the liquid crystals comprise ferroelectric liquid crystals.

In some examples, the device performs fast scanning on the target as one-shot capturing in less than 5 μs. In some examples a response time is less than 5 μs for long-ranging sensing in a zone of the device.

Another example device according to the present techniques can comprise a transmitter comprising a laser and a diffracting ferroelectric liquid crystal Dammann grating component, and a receiver configured to detect at least some of the light emitted by the transmitter that is reflected from a target. In some examples the receiver can comprise a detector. In some examples, the detector can comprise a camera. In some examples, the detector can comprise a CCD array. In some examples, the detector can comprise a photodiode. In some examples, a field of view of the receiver can comprise a 360-degree full-field coverage.

In some examples, the receiver can comprise an electro-optic modulator positioned such that a detector detects the at least some light after it has passed through the electro-optic modulator. In some examples, the electro-optical modulator can comprise two polarizers, a liquid crystal diffractive light modulating cell placed between the two polarizers. The liquid crystal diffractive light modulating can comprise two transparent substrates treated by photo-alignment, and a liquid crystal layer disposed between the two transparent substrates with current conducting layers. In some examples, the two polarizers are crossed.

In some examples, a movement of a target is detected based on a point shift of a matrix spot received by the receiver.

Another example device according to the present techniques can comprise a diffracting ferroelectric liquid crystal Dammann grating component, and a receiver configured to detect at least some light that passes through the diffracting ferroelectric liquid crystal Dammann grating component and that is reflected from a target. In some examples, the device can comprise multiple switchable ferroelectric liquid crystal Dammann gratings. In some examples, the device can comprise multiple layers of switchable ferroelectric liquid crystal cells and ferroelectric liquid crystal Dammann gratings.

In some examples, the device can comprise two models of switchable ferroelectric liquid crystal Dammann gratings, wherein an initial distance between the target and the system is detected based on a diffraction angle of the two models of switchable ferroelectric liquid crystal Dammann gratings.

In some examples, the device can comprise an electro-optic modulator, a diffractive component placed in one a first side of the electro-optic modulator, and a laser positioned on a second side of the electro-optic modulator, the laser being configured to emit light through the electro-optic modulator and the diffractive component.

It can be appreciated that various permutations and combinations of these examples can also be implemented, and that these examples can be embodied in methods and non-transitory computer-readable storage media.

FIG. 1 illustrates an exemplary schematic diagram 100 of ferroelectric Liquid crystals Dammann grating for LiDAR devices, where the receiver includes one detector, in accordance with one or more embodiments described herein. Schematic diagram 100 comprises charge-coupled device (CCD) camera 101, polarizer 102A, polarizer 102B, polarizer 102C, polarizer 102D, electro-optical modulator 103, receiver 104, controller 105, computer 106, alternating-current oscillator 107, alternating-current oscillator 108, laser 109, and FLCDG cell 110.

CCD camera 101 can generally comprise an integrated circuit comprising coupled capacitors, and can serve as an imaging sensor. Each of polarizer 102A, polarizer 102B, polarizer 102C, and polarizer 102D can generally comprise an optical filter that permits light waves possessing a particular polarization to pass through the filter, while blocking other light waves.

Electro-optical modulator 103 can generally comprise an optical device that modulates a light beam via a signal-controlled element exhibiting an electro-optic effect, and can serve as a modulator for time-resolution. Receiver 104 can generally comprise a device that funnels light to be captured by CCD camera 101. Controller 105 can generally be a device that controls a current flow to, or by, other components of schematic diagram 100, such as alternating-current oscillator 107, alternating-current oscillator 108.

Computer 106 can comprise a computing device that controls other components of schematic diagram 100. In some examples, computer 106 can be implemented with aspects of computer 1202 of FIG. 12. Each of alternating-current oscillator 107, alternating-current oscillator 108 can comprise an electronic signal that converts direct current (such as from a power supply) to alternating current, and provides a periodic oscillating electronic signal. For example, alternating-current oscillator 107 can provide this electronic signal to electro-optical modulator 103, and alternating-current oscillator 108 can provide this electronic signal to FLCDG cell 110.

Laser 109 can generally comprise a device emits light via optical amplification based on a stimulated emission of electromagnetic radiation. FLCDG cell 110 can generally comprise a ferroelectric liquid crystal Dammann grating cell.

In an embodiment, FLCDG cell 110 can possess an electrically suppressed helix (ESH) electro-optical mode where a FLC helix pitch is less than a liquid crystal layer thickness. A rectangular voltage signal can be applied to the electrodes of the cell, with amplitude larger than a critical voltage amplitude of the helix unwinding that offers binary On and Off optical states to generate the pulse like electro-optical response for FLCs.

Figure 2:
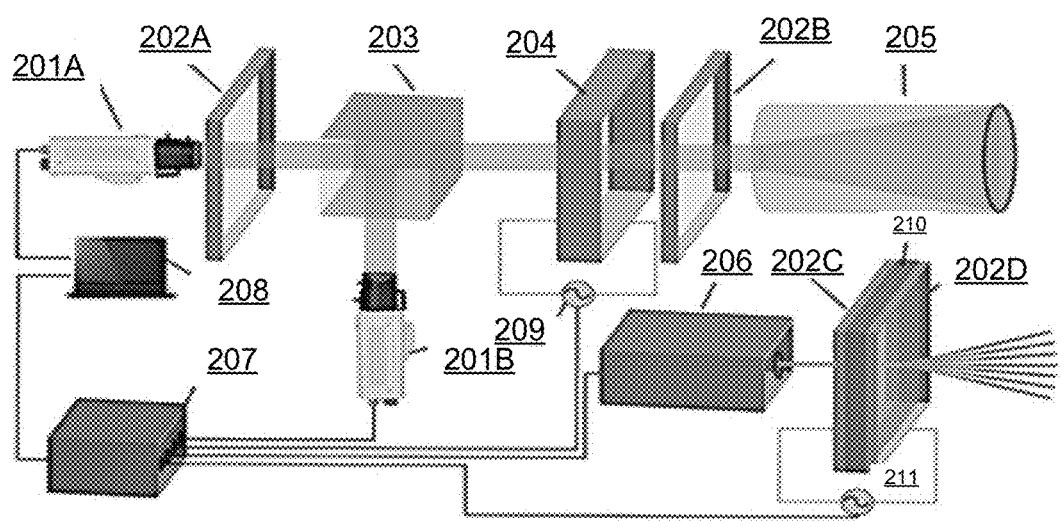
FIG. 2 illustrates an exemplary schematic diagram of ferroelectric Liquid crystals Dammann grating for LiDAR devices, where the receiver includes two detectors that are utilized to detect the intensities of p-polarized and s-polarized light after beam splitting, respectively, in accordance with one or more embodiments described herein.

FIG. 2 illustrates an exemplary schematic diagram 200 of ferroelectric Liquid crystals Dammann grating for LiDAR devices, where the receiver includes two detectors that are utilized to detect the intensities of p-polarized and s-polarized light after beam splitting, respectively, in accordance with one or more embodiments described herein.

Schematic diagram 200 comprises detector array 201A, detector array 201B, polarizer 202A, polarizer 202B, polarizer 202C, polarizer 202D, polarization-beam splitter (PBS) 203, liquid crystal diffractive light modulating cell 204, receiver 205, laser 206, controller 207, computer 208, alternating-current oscillator 209, FLCDG cell 210, and alternating-current oscillator 211.

In an example, receiver 205 includes an electro-optic modulator, wherein the electro-optic modulator includes two polarizers (polarizer 202A and polarizer 202B), and liquid crystal diffractive light modulating cell 204 placed between the two polarizers (polarizer 202A and polarizer 202B). A cell can comprise two transparent substrates treated by photo-alignment, and a liquid crystal layer disposed between the two transparent substrates with current conducting layers. PBS 203 can be placed behind the electro-optic modulator, and two detector arrays (detector array 201A and detector array 201B) can be placed at two orthogonal position to each other after PBS 203. Detector array 201A and detector array 201B can comprise CCD arrays, wherein two CCD arrays can be utilized to detect intensities of p-polarized and s-polarized light, respectively, after beam splitting.

In some examples, detector array 201A and detector array 201B can each be similar to CCD camera 101 of FIG. 1; polarizer 202A, polarizer 202B, polarizer 202C, and polarizer 202D can each be similar to one or more of polarizer 102A, polarizer 102B, polarizer 102C, polarizer 102D of FIG. 1; PBS 203 can comprise a device that splits one beam of light into two beams of light, each beam of light having a different polarization; receiver 205 can be similar to receiver 104 of FIG. 1; laser 206 can be similar to laser 109 of FIG. 1; controller 207 can be similar to controller 105 of FIG. 1; computer 208 can be similar to computer 106 of FIG. 1; alternating-current oscillator 209 and alternating-current oscillator 211 can each be similar to one or more of alternating-current oscillator 107 and alternating-current oscillator 108 of FIG. 1; and FLCDG cell 210 can be similar to FLCDG cell 110 of FIG. 1.

Figure 3:
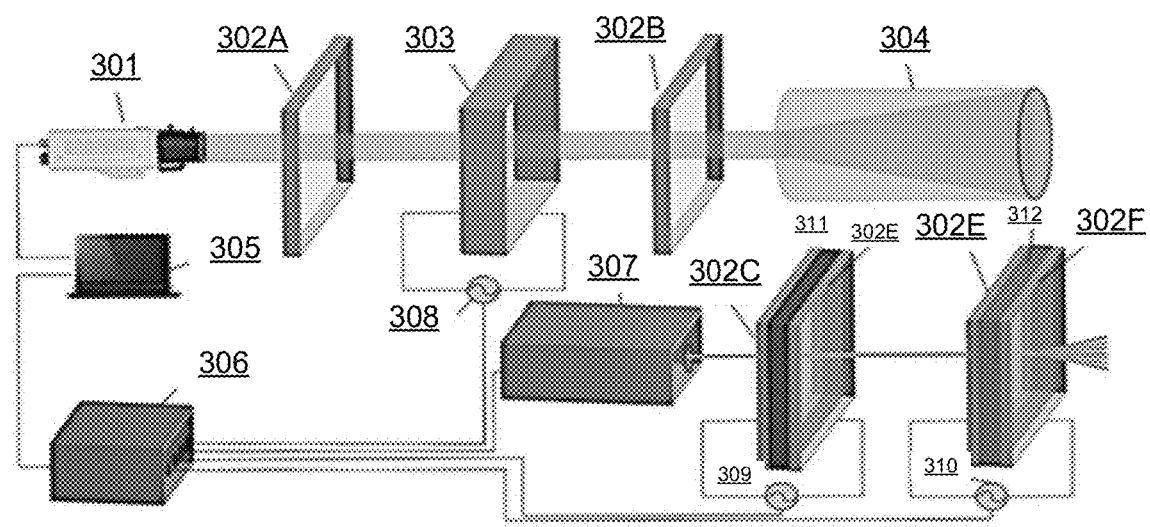
FIG. 3 illustrates an exemplary schematic diagram of ferroelectric Liquid crystals Dammann grating for LiDAR devices, where one electro-optic modulator is placed between the laser and diffractive light modulator to increase the shutter speed, in accordance with one or more embodiments described herein.

FIG. 3 illustrates an exemplary schematic diagram 300 of ferroelectric Liquid crystals Dammann grating for LiDAR devices, where one electro-optic modulator is placed between the laser and diffractive light modulator to increase the shutter speed, in accordance with one or more embodiments described herein. Schematic diagram 300 comprises CCD camera 301, polarizer 302A, polarizer 302B, polarizer 302C, polarizer 302D, polarizer 302E, polarizer 302F, liquid crystal diffractive light modulating cell 303, receiver 304, computer 305, controller 306, laser 307, alternating-current oscillator 308, alternating-current oscillator 309, alternating-current oscillator 310, FLCDG cell 311, and FLCDG cell 312.

A transmitter can comprise an electro-optic modulator and a diffractive light modulator. The electro-optic modulator can comprise two polarizers (polarizer 302C and polarizer 302D), and a FLCDG cell 311 placed between polarizer 302C and polarizer 302D. FLCDG cell 311 can comprise two transparent substrates treated by photo-alignment, and a ferroelectric liquid crystal layer disposed between the two transparent substrates with current conducting layers. A diffractive light modulator can comprise two polarizers (polarizer 302E and polarizer 302F), and a ferroelectric liquid crystal diffractive light modulating cell 312 with a Dammann grating configuration. A driving signal of the electro-optic modulator and the diffractive light modulator can have a same shape as a phase shift for several microseconds. A shutter speed can be increased by applying similar driving signals on two cells with a several microsecond phase shift.

In some examples, an electro-optic modulator and Dammann grating can be implemented using deformed ferroelectric liquid crystals or anti-ferroelectric liquid crystals.

While some examples of an optical splitting aperture are described with respect to at least one FLCDG, there can be examples where an optical splitting aperture can be replaced by another combination of grating (e.g. a fox grating can be used in place of a Dammann grating), or a Dammann grating with different spot matrix than used in these examples.

In some examples, a detector at a receiver can be implemented using at least one charge-coupled device array, camera or photo-diode.

Figure 4A:
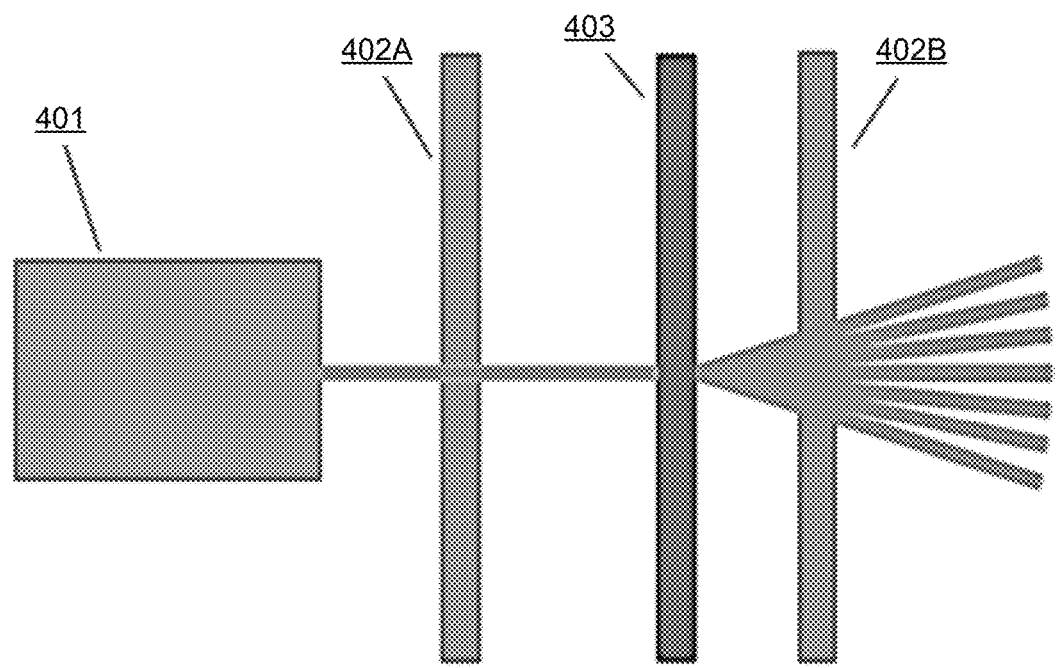
FIG. 4A illustrates an exemplary schematic structural diagram of an optical splitting apparatus at a transmitter, in accordance with one or more embodiments described herein.

FIG. 4A illustrates an exemplary schematic structural diagram 400 of an optical splitting apparatus at a transmitter, in accordance with one or more embodiments described herein. Schematic structural diagram 400 comprises laser 401, two crossed polarizers—polarizer 402A and polarizer 402B, and FLC cell with DG pattern 403.

Figure 4B:
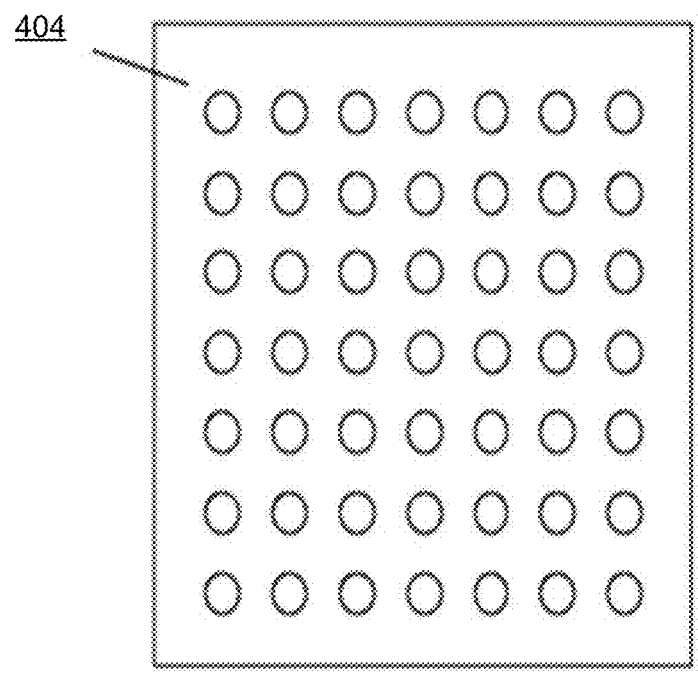
FIG. 4B illustrates an exemplary graphical diagram illustrating a diffractive spot matrix formed on a target by laser beams at a transmitter based on a diffraction order of Dammann grating, in accordance with one or more embodiments described herein.

FIG. 4B illustrates an exemplary graphical diagram 450 illustrating a diffractive spot matrix formed on a target by laser beams at a transmitter based on a diffraction order of Dammann grating, in accordance with one or more embodiments described herein. Exemplary graphical diagram 450 comprises Dammann grating 404.

Transparent substrates treated with Dammann grating patterned photo-alignment can be configured to generate equal-intensity spot matrix 402A and equal-intensity spot matrix 402B of FIG. 4A based on diffraction profile of Dammann grating 404.

In addition to this, an electro-optic modulator (such as electro-optical modulator 403 of FIG. 4A) can be utilized as a liquid crystal diffractive light modulating cell placed between equal-intensity spot matrix 402A and equal-intensity spot matrix 402B of FIG. 4! (each of which can be a polarizer). A triangular voltage can be applied to the cell for the polarization modulation of the received light at the receiver end.

In some examples, the data collection period can be 5 µs with a one-time projection for a whole target. Dammann Grating diffractive spots can be wide enough to capture a whole front view in one shot. A 7×7 array for Dammann Grating can be used. In these examples, a number and shape of spots can vary depending on a Dammann grating profile.

Figure 5A:
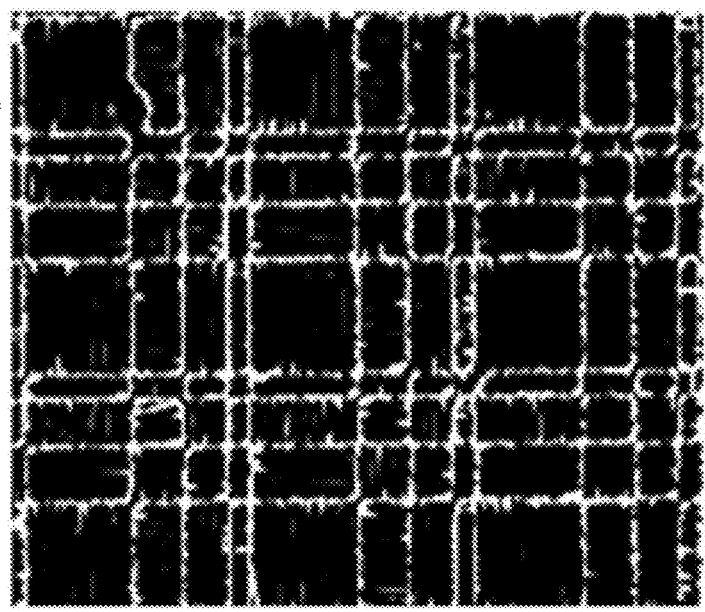
FIG. 5A illustrates an optical micrograph of a dark state of ferroelectric liquid crystals Dammann grating under a cross polarizer, in accordance with one or more embodiments described herein.

FIG. 5A illustrates an optical micrograph 500 of a dark state 501 of ferroelectric liquid crystals Dammann grating under a cross polarizer, in accordance with one or more embodiments described herein. A diffractive spot matrix projected on a target plane can be provided by a Dammann grating patterned photo-alignment configuration. In some examples, a Dammann grating profile can be generated by FLC micro-displays.

Figure 5B:
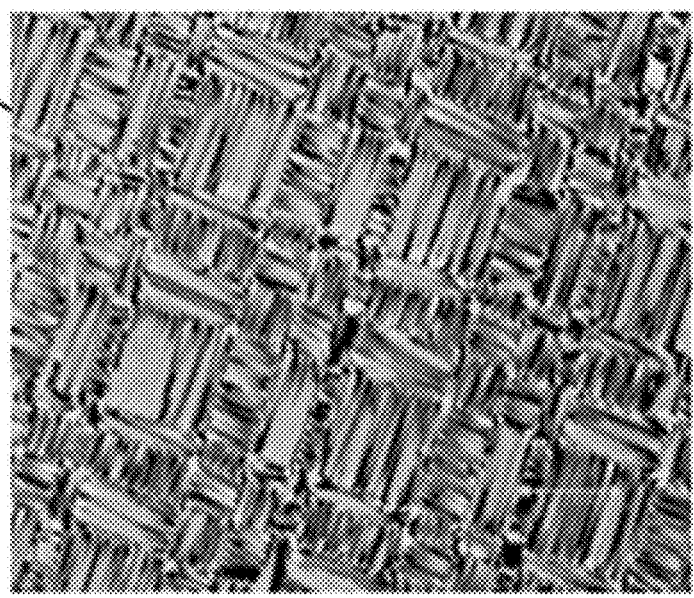
FIG. 5B illustrates an optical micrograph of a bright state of ferroelectric liquid crystals Dammann grating under a cross polarizer, in accordance with one or more embodiments described herein.

FIG. 5B illustrates an optical micrograph 550 of a bright state 502 of ferroelectric liquid crystals Dammann grating under a cross polarizer, in accordance with one or more embodiments described herein. A diffractive spot matrix projected on a target plane can be provided by a Dammann grating patterned photo-alignment configuration. In some examples, a Dammann grating profile can be generated by FLC micro-displays.

Figure 6:
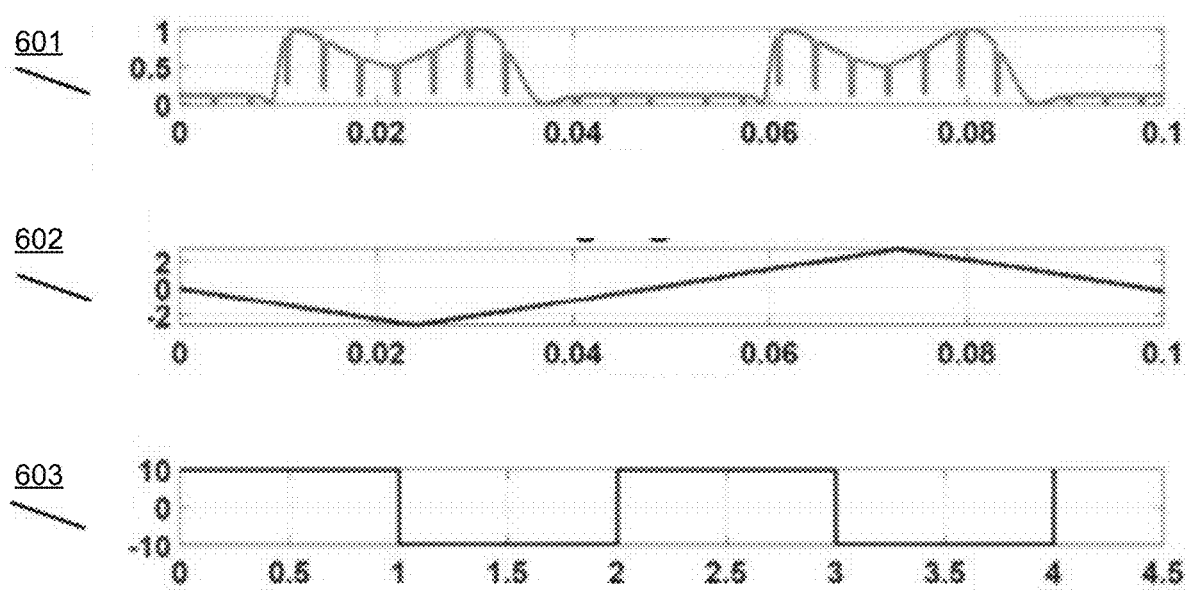
FIG. 6 illustrates graphs of a relationship between a received signal, a driving electric waveform of electro-optic modulator, and a Dammann grating, in accordance with one or more embodiments described herein.

FIG. 6 illustrates graphs 600 of a relationship between a received signal, a driving electric waveform of electro-optic modulator, and a Dammann grating, in accordance with one or more embodiments described herein. Graphs 600 comprise graph 601, graph 602, and graph 603.

Graph 601 plots intensity (in arbitrary units (AU)) over time (in seconds (s)) for a received, or detected, signal of an image sensor. Graph 602 plots voltage (in volts (V)) over time (in milliseconds (ms)) of a driving electrical waveform, or signal, of an electric-optic modulator (EOM). Graph 603 plots voltage (V) over time (ms) of a driving electrical waveform, or signal, of a Dammann grating.

Figure 7A:
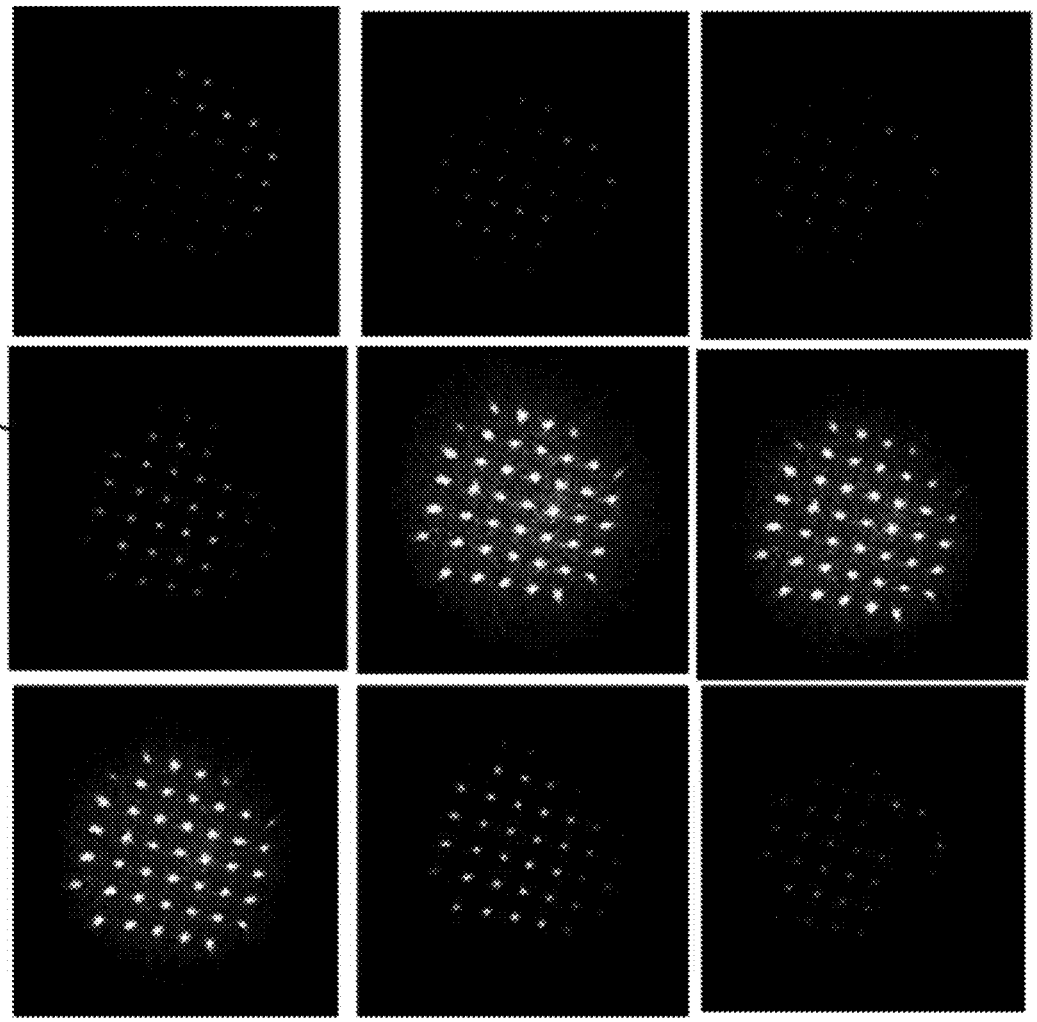
FIG. 7A illustrates received images with periodic variation captured by a detector, in accordance with one or more embodiments described herein.

FIG. 7A illustrates received images 700 with periodic variation captured by a detector, in accordance with one or more embodiments described herein. Received images 700 comprises image 701, which can be taken in one period at 2,400 Hz.

Figure 7B:
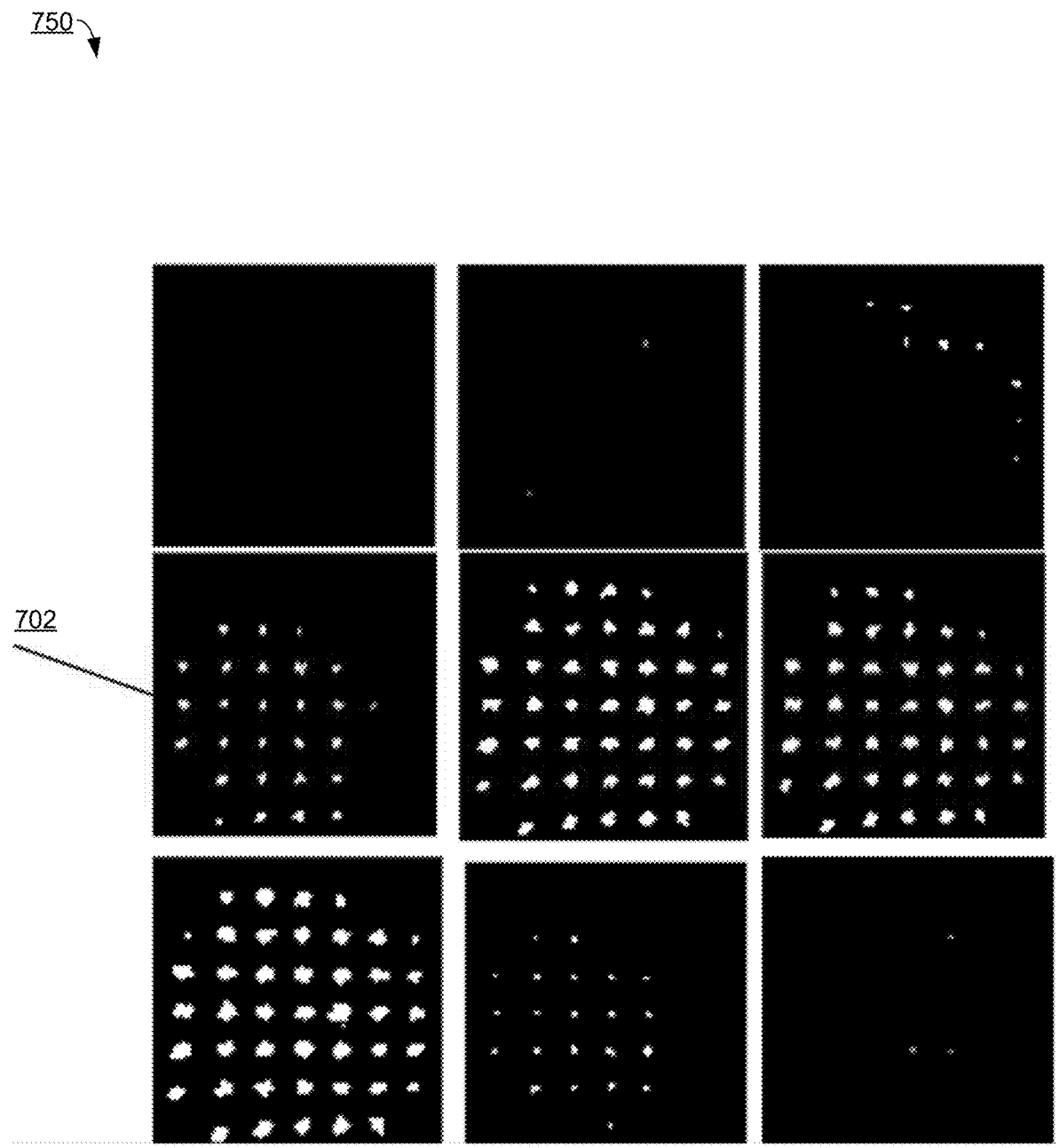
FIG. 7B illustrates normalized intensity maps after calibration of captured images, in accordance with one or more embodiments described herein.

FIG. 7B illustrates normalized intensity maps 750 after calibration of captured images, in accordance with one or more embodiments described herein. Normalized intensity maps 750 comprises images 702, which can be a calibrated result of images 701 of FIG. 1.

FIG. 8A illustrates a schematic graph 800 of processed intensity maps, in accordance with one or more embodiments described herein. Schematic graph 800 can correspond to a normalized intensity map of normalized intensity maps 750 of FIG. 7B. Schematic graph 800 can depict a relationship of a detected light intensity and a distance to the target based on comparing information extracted by each point based upon a color image of a spot matrix captured by a detector. In this example, a field of view achieves 360-degree full field coverage and millimeter's ranging precision by replacing traditional iterative scanning with one-shot capturing.

Schematic graph 800 comprises 25 pixels, arranged in a 5×5 array pixel 801, pixel 802, pixel 803, pixel 804, pixel 805, pixel 806, pixel 807, pixel 808, pixel 809, pixel 810, pixel 811, pixel 812, pixel 813, pixel 814, pixel 815, pixel 816, pixel 817, pixel 818, pixel 819, pixel 820, pixel 821, pixel 822, pixel 823, pixel 824, and pixel 825.

Figure 8B:
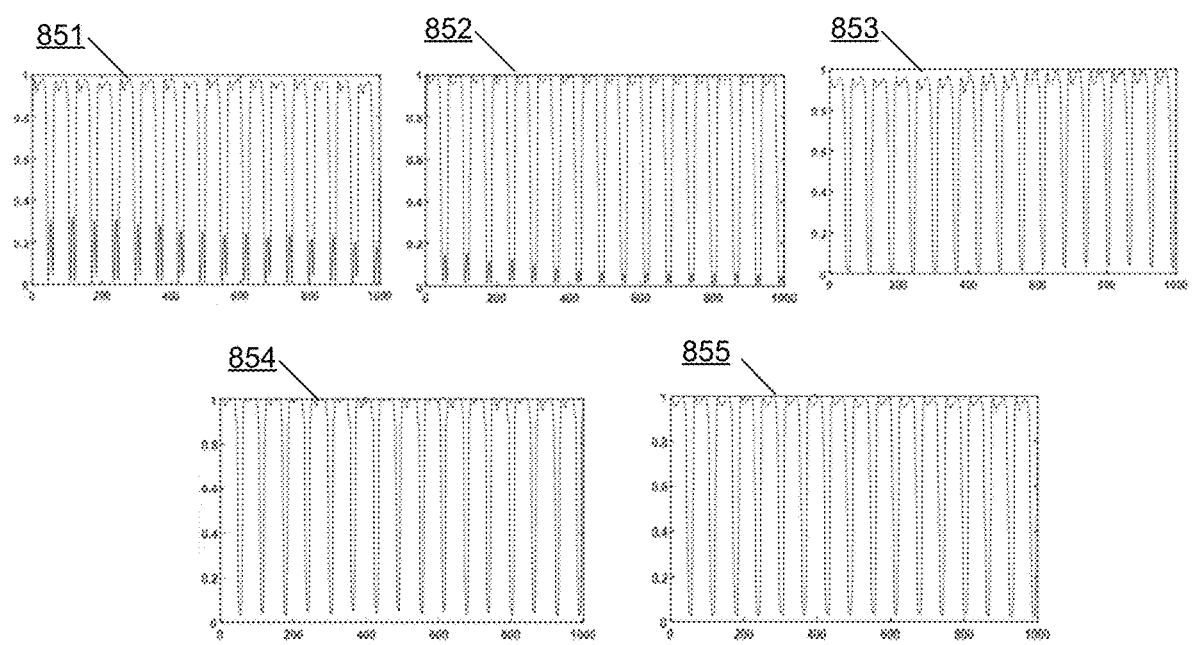
FIG. 8B illustrates a graph plotting received intensity versus shutter times of pixels at a third row of a diffractive spot matrix, in accordance with one or more embodiments described herein.

FIG. 8B illustrates graphs 850 plotting received intensity versus shutter times of pixels at a third row of a diffractive spot matrix, in accordance with one or more embodiments described herein. Graph 851 corresponds to pixel 811 of FIG. 8A. Graph 852 corresponds to pixel 812 of FIG. 8A. Graph 853 corresponds to pixel 813 of FIG. 8A. Graph 854 corresponds to pixel 814 of FIG. 8A. Graph 855 corresponds to pixel 815 of FIG. 8A. Each of graphs 851-855 plot intensity (AU) over a number of frames (using a frame rate of 1400 frames/second).

Figure 9A:
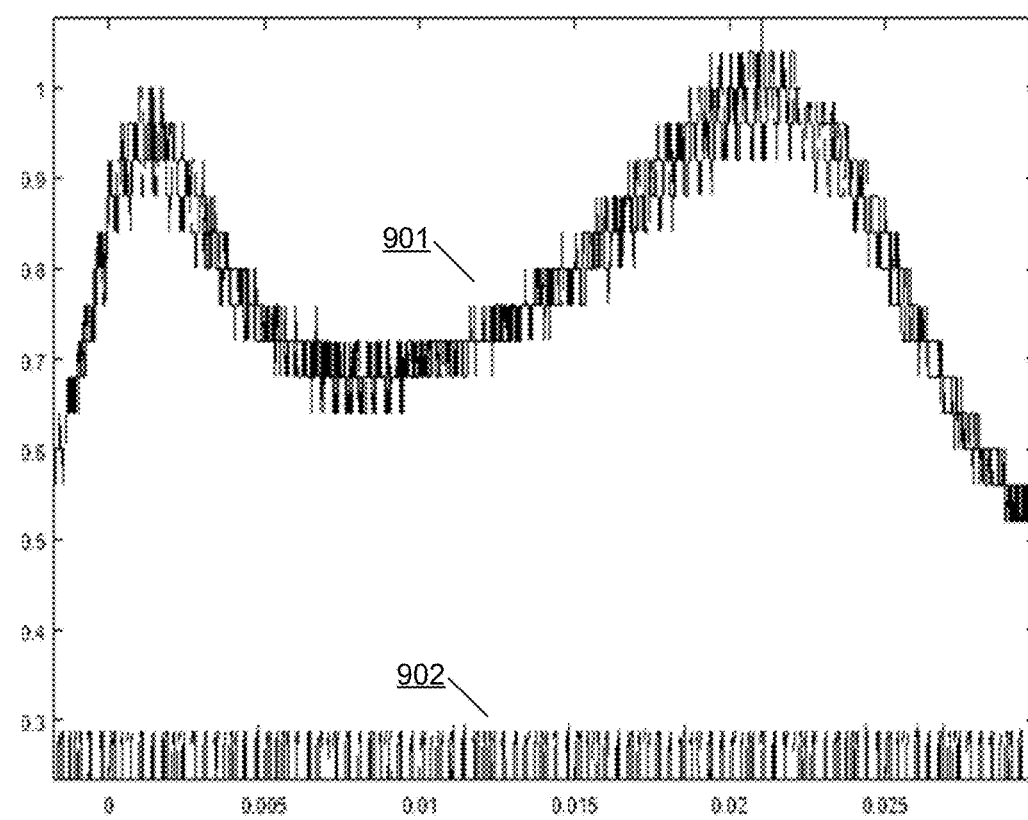
FIG. 9A illustrates a graph plotting shutter speed when a transmitter includes an electro-optic modulator and a diffractive light modulator which are placed parallel to each other, in accordance with one or more embodiments described herein.

FIG. 9A illustrates a graph 900 plotting shutter speed when a transmitter includes an electro-optic modulator and a diffractive light modulator which are placed parallel to each other, in accordance with one or more embodiments described herein. Graph 900 comprises plot 901 and plot 902. Both plot 901 and plot 902 plot applied voltage (V) over time (s). Plot 902 represents an input signal at 1,000 cycles per second (1 kHz), and plot 901 represents an output, or detected signal.

Figure 9B:
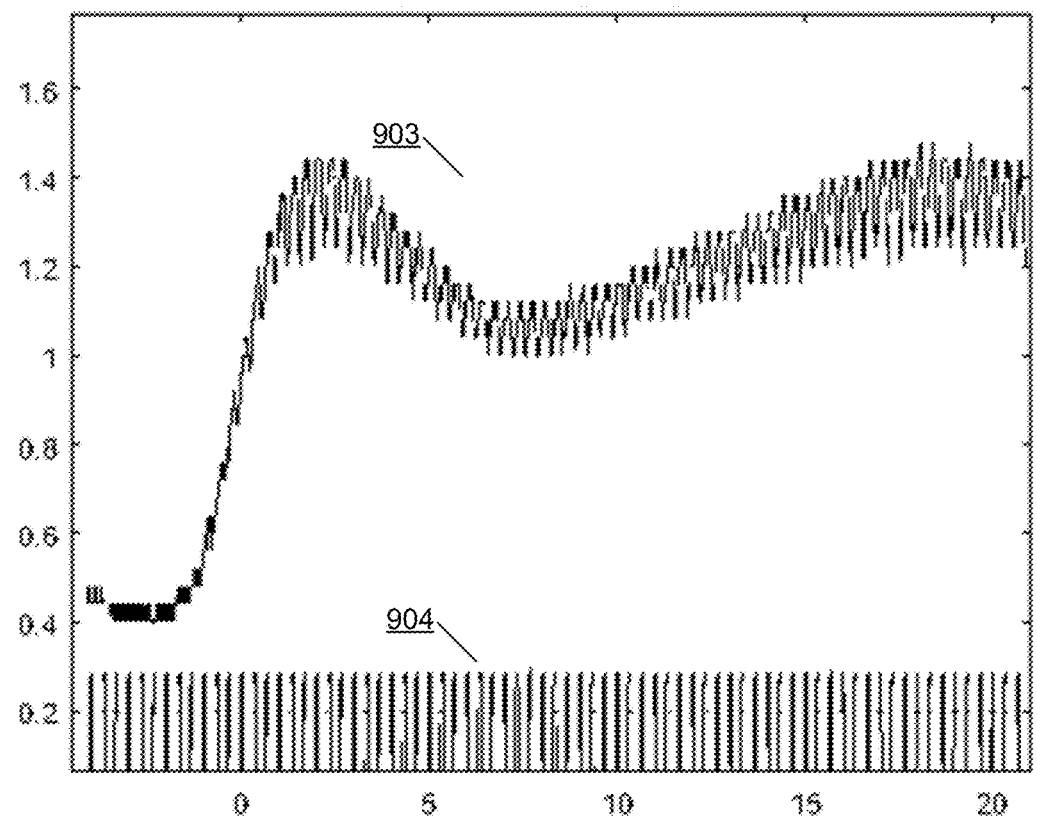
FIG. 9B illustrates a graph plotting shutter speed when a transmitter includes a diffractive light modulator, in accordance with one or more embodiments described herein.

FIG. 9B illustrates a graph 950 plotting shutter speed when a transmitter includes a diffractive light modulator, in accordance with one or more embodiments described herein. Graph 900 comprises plot 903 and plot 904. Both plot 903 and plot 904 plot applied voltage (V) over time (s). Plot 904 represents an input signal at 1 kHz, and plot 903 represents an output, or detected signal.

Figure 10A:
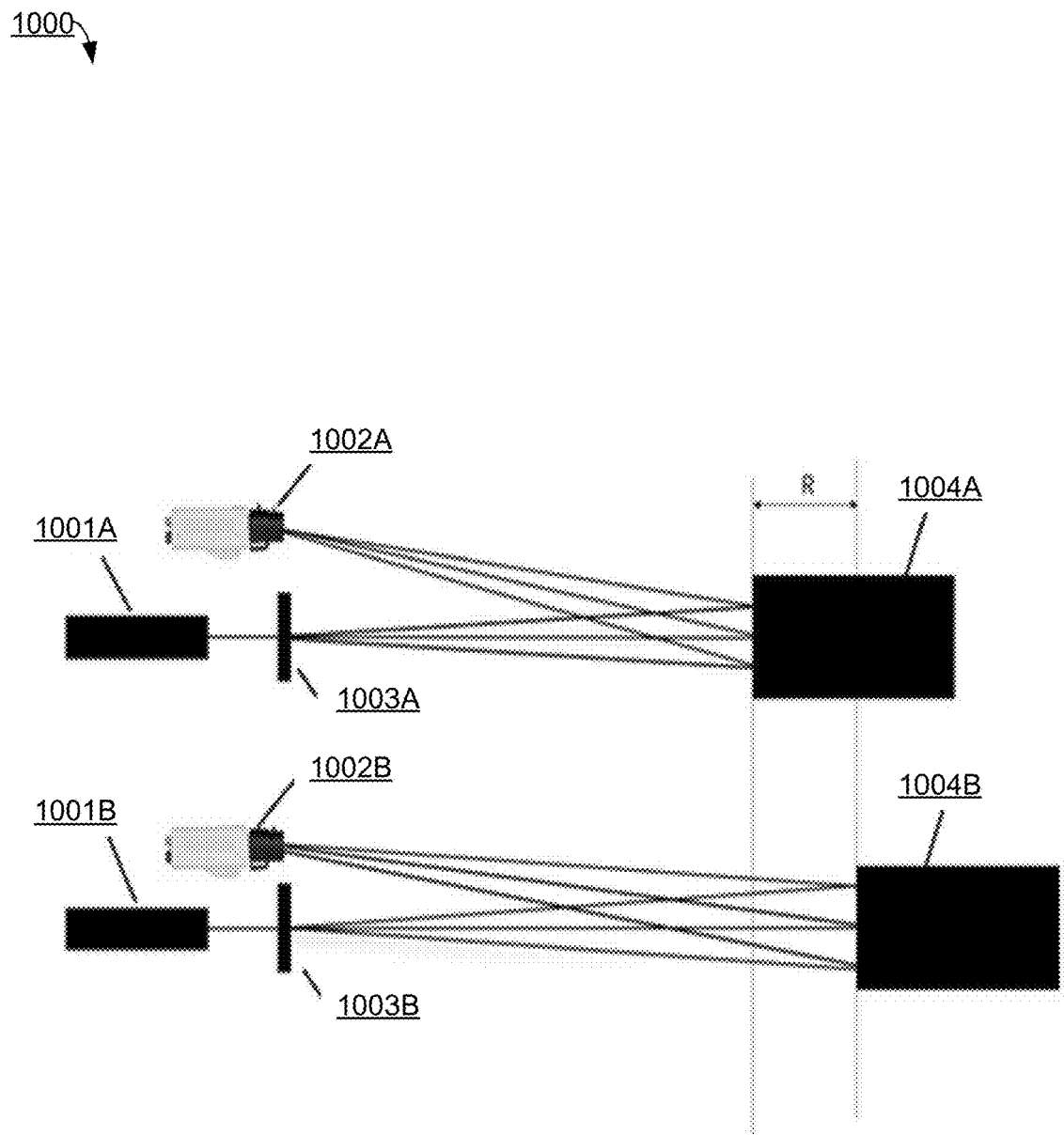
FIG. 10A illustrates an exemplary schematic diagram of a change of light propagation for target movement, in accordance with one or more embodiments described herein.

FIG. 10A illustrates an exemplary schematic diagram 1000 of a change of light propagation for target movement, in accordance with one or more embodiments described herein. Exemplary schematic diagram comprises laser 1001A, CCD camera 1002A, FLCDG cell 1003A, and object 1004A, which represents capturing object 1004A at time t.

Then, exemplary schematic diagram also comprises laser 1001B, CCD camera 1002B, FLCDG cell 1003B and object 1004B, which represents capturing object 1004B at time t+1, after which it has traveled a distance of R relative to time t.

In some examples, each of laser 1001A and laser 1001B can be similar to laser 109 of FIG. 9; each of CCD camera 1002A and CCD camera 1002B can be similar to CCD camera 101 of FIG. 1; and each of FLCDG cell 1003A and FLCDG cell 1003B can be similar to FLCDG cell 110 of FIG. 1.

Figure 10B:
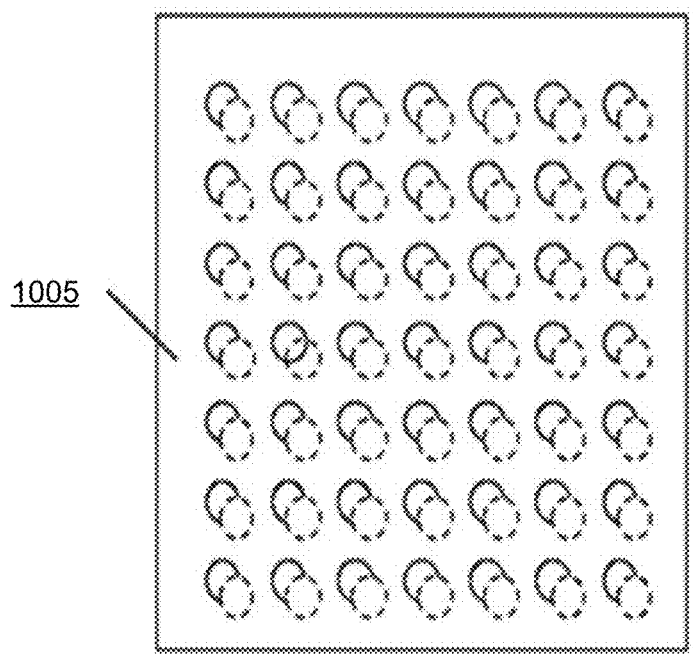
FIG. 10B illustrates an exemplary schematic structural diagram of a matrix spot shift compared with a prior state at the detector, in accordance with one or more embodiments described herein.

FIG. 10B illustrates an exemplary schematic structural diagram 1050 of a matrix spot shift compared with a prior state at the detector, in accordance with one or more embodiments described herein. Exemplary schematic structural diagram 1050 comprises initial movement R 1004. For example, the spot shift of structural diagram can represent a spot shift from measuring object 1004A at time t in FIG. 10A and then object 1004B at time t+1 in FIG. 10A.

Initial movement R 1004 of a target can be recognized based on spot shift 1005 by comparing spots for a given state with a previous state of a detected spot matrix.

Figure 11A:
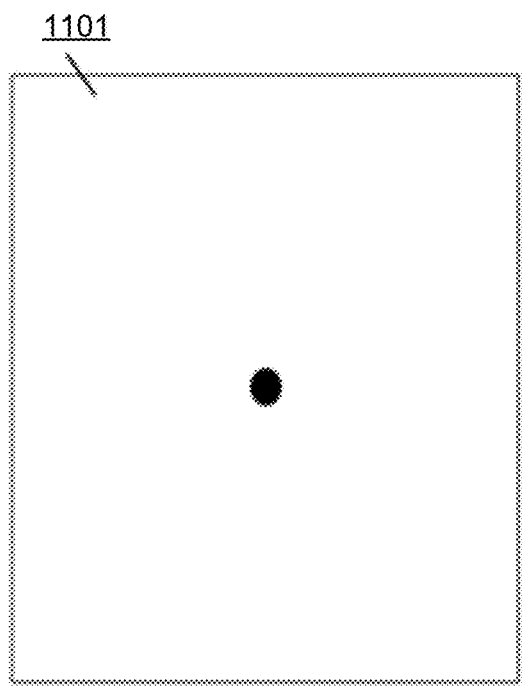
FIG. 11A illustrates an exemplary schematic structural diagram of a single spot state of a switchable Dammann grating, in accordance with one or more embodiments described herein.

FIG. 11A illustrates an exemplary schematic structural diagram 1100 of a single spot state of a switchable Dammann grating, in accordance with one or more embodiments described herein.

Figure 11B:
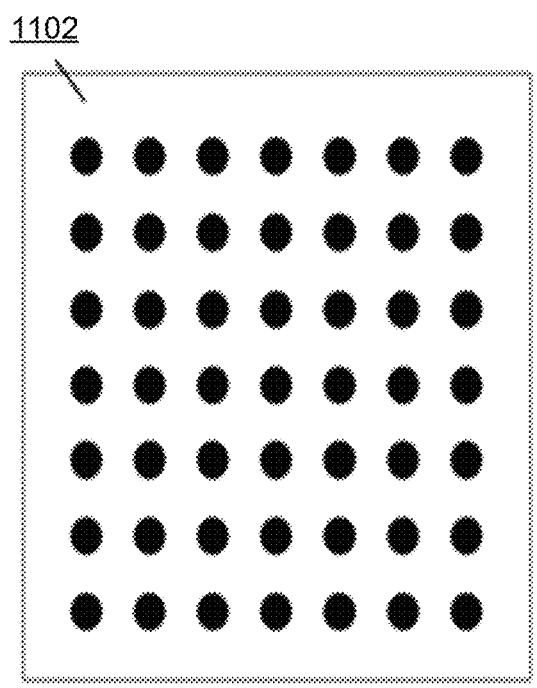
FIG. 11B illustrates an exemplary schematic structural diagram of a diffractive state of a switchable Dammann grating, in accordance with one or more embodiments described herein.

FIG. 11B illustrates an exemplary schematic structural diagram 1150 of a diffractive state of a switchable Dammann grating, in accordance with one or more embodiments described herein.

An initial distance between a target and a transmitter can be recognized in a micro-second based on a switchable Dammann grating cell. Specifically, an object's distance can be derived based on a diffraction angle between a non-diffractive state 1101 of FIG. 11A and a diffractive state 1102 of FIG. 11B.

CONCLUSION

The word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A light detection and ranging device, comprising:
   a diffracting ferroelectric liquid crystal Dammann grating component;
   a laser configured to emit light through the ferroelectric liquid crystal Dammann grating component; and
   a receiver configured to detect at least some of the light emitted by the laser that is reflected from a target, wherein the receiver comprises an electro-optic modulator positioned to enable a detector to detect at least some light that has passed through the electro-optic modulator.

2. The device of claim 1, wherein the diffracting ferroelectric liquid crystal Dammann grating component comprises:
   two polarizers; and,
   a liquid crystal diffractive light modulating cell with a phase profile of a Dammann grating positioned between the two polarizers.

3. The device of claim 2, wherein the liquid crystal diffractive light modulating cell comprises:
   two transparent substrates coated with a current conducting layer;
   a patterned alignment layer, coated on one of the transparent substrates, wherein the patterned alignment layer is patterned to satisfy the phase profile of the Dammann grating; and
   a ferroelectric liquid crystal layer positioned between the two transparent substrates.

4. The device of claim 3, wherein the patterned alignment layer comprises:
   a photoalignment layer that aligns ferroelectric liquid crystals of the ferroelectric liquid crystal layer in patterns according to the Dammann grating profile.

5. The device of claim 3, wherein ferroelectric liquid crystals of the ferroelectric liquid crystal layer comprise:
   electrically suppressed helix ferroelectric liquid crystals with a helix pitch smaller than a thickness of the ferroelectric liquid crystal layer.

6. The device of claim 3, wherein ferroelectric liquid crystals of the ferroelectric liquid crystal layer comprise:
   surface stabilized ferroelectric liquid crystals with a helix pitch larger than a thickness of the ferroelectric liquid crystal layer.

7. The device of claim 3, wherein ferroelectric liquid crystals of the ferroelectric liquid crystal layer comprise deformed helix ferroelectric liquid crystals with a helix pitch that is more than 5 times smaller than the thickness of the ferroelectric liquid crystal layer.

8. The device of claim 3, wherein ferroelectric liquid crystals of the ferroelectric liquid crystal layer comprise:
   anti-ferroelectric liquid crystals.

9. The light detection and ranging device of claim 1, wherein the electro-optical modulator comprises:
   two polarizers; and
   a liquid crystal diffractive light modulating cell placed between the two polarizers, the liquid crystal diffractive light modulating comprising:
   two transparent substrates treated by photo-alignment, and
   a liquid crystal layer disposed between the two transparent substrates with current conducting layers.

10. The light detection and ranging device of claim 1, wherein the light detection and ranging device is configured to detect a translational and rotational movement of the target based on a point shift of a spot matrix projected onto the target and received by the receiver.

11. The light detection and ranging device of claim 1, wherein the receiver comprises:
    the detector.

12. A device, comprising:
    a transmitter comprising a laser and a diffracting ferroelectric liquid crystal Dammann grating component; and
    a receiver configured to detect at least some of the light emitted by the transmitter that is reflected from a target, wherein the receiver comprises an electro-optic modulator positioned to allow a detector to detect at least some light that has passed through the electro-optic modulator.

13. The device of claim 12, wherein the receiver comprises:
    the detector.

14. The device of claim 13, wherein the detector comprises a camera.

15. The device of claim 12, wherein the electro-optical modulator comprises:
    two polarizers; and
    a liquid crystal diffractive light modulating cell placed between the two polarizers, the liquid crystal diffractive light modulating comprising:
    two transparent substrates treated by photo-alignment, and
    a liquid crystal layer disposed between the two transparent substrates with current conducting layers.

16. The device of claim 15, wherein the two polarizers are crossed.

17. The device of claim 12, wherein the device is configured to detect a translational and rotational movement of the target based on a point shift of a spot matrix projected onto the target and received by the receiver.

18. A system, comprising:
    a diffracting ferroelectric liquid crystal Dammann grating component; and
    a receiver configured to detect at least some light that passes through the diffracting ferroelectric liquid crystal Dammann grating component and that is reflected from a target, wherein the receiver comprises an electro-optic modulator positioned to result in a detector being able to detect at least some light that has passed through the electro-optic modulator.

19. The system of claim 18, wherein the electro-optical modulator comprises:
    two polarizers; and
    a liquid crystal diffractive light modulating cell placed between the two polarizers, the liquid crystal diffractive light modulating comprising:
    two transparent substrates treated by photo-alignment, and
    a liquid crystal layer disposed between the two transparent substrates with current conducting layers.

20. The system of claim 18, wherein the light detection and ranging device is configured to detect a translational and rotational movement of the target based on a point shift of a spot matrix projected onto the target and received by the receiver.

* * * * *